May 22, 1951 W. DZUS 2,553,963
STEERING GUIDE FOR MOTOR VEHICLES
Filed Nov. 13, 1947
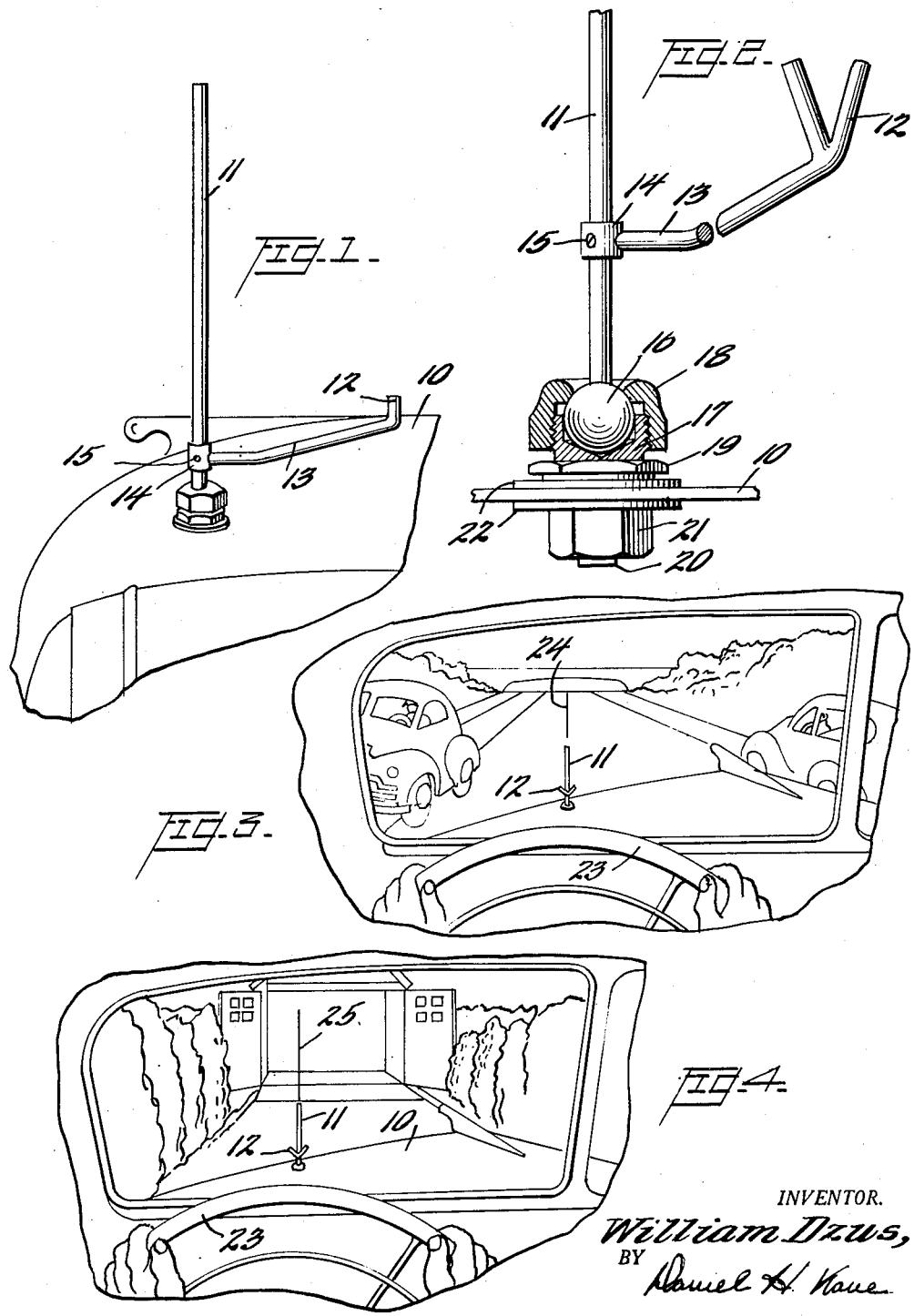
INVENTOR.
William Dzus,
BY
Daniel H. Kane
Attorney Patented May 22, 1951

2,553,963

UNITED STATES PATENT OFFICE 2,553,963

STEERING GUIDE FOR MOTOR VEHICLES

William Dzus, West Islip, N. Y.

Application November 13, 1947, Serial No. 785,637

2 Claims. (Cl. 33—46)

This invention relates to an improved guide or sight for use with motor vehicles to aid the operator in steering the vehicle.

In motor vehicles, particularly modern motor vehicles having relatively high hoods, crown type of fenders and low seats, it is difficult for the operator to accurately gauge the exact location of the edges of the car and also he cannot see the roadway directly in front of and at the sides of the car, which in turn makes it difficult to judge clearances and to properly steer the car.

It is an object of the invention to overcome these difficulties and to provide an improved guide or sight whereby the operator can accurately steer the car and is enabled thereby to gauge his clearances.

Heretofore, attempts have been made to provide various devices to be used in guiding the operator in steering the car. However, these devices have been more or less unsatisfactory, due to the fact that their accuracy in operation is affected by the relative angle between the operator and the device, which in turn varies with the position of the operator on the seat and the relative adjusted position of the seat.

It is, accordingly, a further object of this invention to overcome these disadvantages and to provide a guide or sight for motor vehicles whereby the variable factors can be controlled or eliminated and the steering can be accurately guided.

In the accompanying drawing,

Fig. 1 is a side elevational view of a steering guide embodying my invention showing it applied to the hood of a motor vehicle;

Fig. 2 is a partially fragmentary view of the guide;

Fig. 3 is an elevational view of the guide as seen from the driver's seat indicating the use and operation of the device on the open highway, and;

Fig. 4 is a similar view showing the use of the device for guiding the vehicle into and out of a confined or restricted area such as a driveway and garage.

My invention is applicable for use with motor vehicles and consists generally of a pair of spaced sights parallel to the longitudinal axis of the car and located at the forward portion of the car in the line of vision of the operator, whereby the operator can align the sights with each other and with additional bearing points or markings and in that manner accurately steer and control the vehicle.

In the drawing, I have shown the device as applied to the hood 10 of a motor vehicle. The device consists generally of a forward sight 11 and a rear sight 12 spaced therefrom and both located in a line parallel to the longitudinal axis of the car and in the line of vision of the operator. The sights may be supported in any desired manner. In the present instance, the forward sight 11 is illustrated in the form of a vertical rod and the rear sight is shown as a V-shaped member formed on the end of arm 13, which in turn is supported by an adjustable collar 14 mounted on the rod 11. The collar 14 is provided with a set screw 15 whereby it may be locked in position after the sights have been adjusted.

The sights may be made of any desired material such as a metal which, preferably, is corrosion resistant, such as stainless steel, or is suitably plated or coated. The sights are mounted, as previously stated, in the line of vision of the operator, that is, approximately in front of the steering post of the vehicle.

The attachment to the vehicle may take any desired form. I have illustrated one suitable method of attaching the device which provides for adjustment thereof. This arrangement consists of a ball and socket attachment consisting of the ball 16 attached to the lower end of rod 11 and disposed in the socket member 17 and held in place by the threaded cap 18 screwed thereon. Beneath the socket, the socket member is preferably provided with an integral hex nut 19 and a depending stud 20 which extends through an aperture formed through the forward portion of the engine hood in line with the steering post and is held in place by nut 21. Suitable washers or gaskets 22 are provided immediately above and below the engine hood surface as shown in Fig. 2.

In applying the device to a motor vehicle, it is first attached, in the manner shown and previously described, in the direct line of vision, as for instance, to the forward portion of the engine hood in front of the steering post. Sight 11 is then adjusted to vertical position and cap 18 is tightened to maintain it in this position. Thereafter, the rear sight 12 is adjusted to the proper height, that is, so that from the operator's position the V notch appears to be near the lower portion of rod 11 as shown in Figs. 3 and 4. The rear sight is also adjusted so as to be in a direct line to the rear of the front sight. In other words, the rear sight and front sight are in a line parallel to the longitudinal axis of the motor vehicle. When properly adjusted, set screw 15 is tightened to lock the sights in adjusted position. The operator can then view the forward sight 11 through the V of the rear sight and can sight downwardly through or past the forward sight to bearings or markings on the highway.

In using the device, the operator is seated in normal manner behind the steering wheel, and he brings his line of vision in alignment with the two sights so that the line of vision from the operator to the two sights is in turn parallel with the longitudinal axis of the car. The operator can then guide the steering of the vehicle by means of bearing points or markings which he aligns with the two sights. The bearing points may take the form of either real or imaginary markings and may consist of markings intentionally made for this purpose or pre-existing markings for some other purpose.

In Fig. 3, I have illustrated the view presenting itself to the driver of a vehicle using my device on the open highway. A portion of the steering wheel is shown at 23 and the operator is positioned in the line of vision of the forward and rear sights 11 and 12. It will be seen that these sights have been brought into alignment with a marking, in the form of a stripe 24, formed along the highway. Stripe 24 may be painted or otherwise applied to the highway for this purpose, in which event parallel stripes are arranged so that cars driving along the highway and using the stripes as bearing points for the guides will have adequate clearance. In this manner, the operator may merely align the guides to the stripes, as shown in Fig. 3, and even though he cannot view either the outer edges of the car or the highway directly in front and to the sides of the car, he can confidently proceed along the highway knowing that he has adequate clearance between the other cars that he passes. Thus the driver is released from any tension which, in turn, results in increased safety.

Where markings in the form of stripes are not provided on the highway for this purpose, other markings, such as the oil deposit strip seen clearly on concrete highways, may be used as a bearing point. Also, imaginary markings or bearing points a fixed distance from a center stripe or from an edge may be used for this purpose. Furthermore, my guide may also be used merely for selecting or determining the approximate center point between two objects such as two vehicles, or between a vehicle and the edge of the highway.

My improved guide is also useful in driving into and out of confined areas such as tunnels, narrow bridges or garages and driveways, as shown in Fig. 4. Under such circumstances, a bearing point, such as the stripe 25, is preferably provided on the road, floor or rear wall or both and this bearing point is arranged so that when the guide sights are brought into alignment therewith, there is adequate clearance between the sides of the car and the side walls of the garage or other object or objects in the confined area. When used in confined areas such as this, the driver need not make direct observations to the rear of the car but can guide himself when driving both forwardly and rearwardly merely by aligning the guide sights with the markings.

It will be seen that due to the fact that the guide sights 11 and 12 are arranged parallel to the longitudinal axis of the car and due to the further fact that they are located in the line of vision of the operator, the variable factors resulting from variations in the angle between the operator and the guide are eliminated and an accurate determination can always be made. Due to the fact that the forward sight is located near the front of the car, any slight departure from proper or accurate steering is magnified or multiplied as observed from the driver's seat and, accordingly, can be immediately and readily corrected.

My improved sight is also useful in gauging longitudinal distances in front of the car. It will be seen in Figs. 3 and 4 that a certain amount of sight 11 is observed above the V of sight 12. This amount remains relatively fixed for a given height and, accordingly, the operator can soon learn to estimate the distance represented by projection of rod 11 upon the highway. In this manner the proper distance can readily be maintained between vehicles.

It will also be seen that my improved guide is of economical construction, is easily applied to a motor vehicle and can readily be used by any operator.

The embodiment shown and described herein is merely intended as illustrative and modifications may, of course, be made without departing from the invention.

I claim:

1. In a system for guiding the steering of a motor vehicle of the type having a driver's seat, a steering post in front of the driver's seat and a body portion extending forward therefrom, a steering guide comprising a pair of sights mounted in closely-spaced relationship near the front of the forwardly extending body portion, one of said sights being in the form of a vertical rod and the other sight being in the form of a V-shaped member spaced a short distance from the first-mentioned sight and being mounted thereon by means of a bracket, said sights being arranged in approximate alignment with the steering post with the line of sight parallel to the longitudinal axis of the motor vehicle.

2. In a system for guiding the steering of a motor vehicle of the type having a driver's seat, a steering post in front of the driver's seat and a body portion extending forwardly therefrom, a steering guide as set forth in claim 1 in which the bracket is adjustable and provides for both vertical and horizontal adjustment of the V-shaped member.

WILLIAM DZUS.

REFERENCES CITED

The following references are of record in the file of this patent:

UNITED STATES PATENTS

| Number | Name | Date |
|---|---|---|
| 737,755 | Marceau | Sept. 1, 1903 |
| 1,782,992 | Johnson | Nov. 25, 1930 |
| 1,801,469 | Wagner | Apr. 21, 1931 |
| 2,046,581 | Reeves | July 7, 1936 |
| 2,360,368 | Ribissow | Oct. 17, 1944 |